United States Patent [19]

Gray et al.

[11] Patent Number: 5,857,715
[45] Date of Patent: Jan. 12, 1999

[54] PIPELINE BRANCH ARRANGEMENT

[75] Inventors: David Arthur Gray, Cypress; Gary Edward Harrison, Katy; Stephen Talbot McCoy, Missouri City, all of Tex.

[73] Assignee: J. Ray McDermott, S.A., New Orleans, La.

[21] Appl. No.: 923,885

[22] Filed: Sep. 4, 1997

[51] Int. Cl.[6] .................................................. F16L 41/02
[52] U.S. Cl. ................... 285/131.1; 285/284.1; 285/126.1; 15/104.061
[58] Field of Search ............. 285/131.1, 132.1, 285/126.1, 125.1, 284.1; 15/104.061, 3.5

[56] References Cited

U.S. PATENT DOCUMENTS

| | | | |
|---|---|---|---|
| 689,045 | 12/1901 | Fruin et al. | 285/126.1 |
| 973,794 | 10/1910 | Lightcap | 15/3.5 |
| 1,562,199 | 11/1925 | Baumann | 15/3.5 |
| 1,571,707 | 2/1926 | Casper | 285/132.1 |
| 3,047,020 | 7/1962 | Barrett, Jr. | 15/3.5 |
| 3,116,503 | 1/1964 | Bagwell | 15/3.5 |
| 3,135,278 | 6/1964 | Foord et al. | 15/3.5 |
| 4,971,307 | 11/1990 | Killerud et al. | 285/131.1 |

FOREIGN PATENT DOCUMENTS 815416  6/1969  Canada ................... 285/137

*Primary Examiner*—Eric K. Nicholson
*Attorney, Agent, or Firm*—Robert J. Edwards; D. Neil LaHaye

[57] ABSTRACT

A pipeline branch arrangement that forms a piggable-Y at the intersection with the trunkline and is oriented vertically relative to the trunkline. The approach piping to all legs of the piggable-Y are configured to incorporate 3D bend or larger radii as required. This arrangement permits the passage of foam pigs, hard pigs, and smart pigs. Rotation of the piggable-Y to the vertical plane configures all of the branch piping in the vertical plane, which permits the support sled width for pipe laying to be kept to a minimum. The arrangement of the 3D bends fore and aft of the piggable-Y aligns the trunkline ends in a co-linear manner. This permits the configuration to be installed by conventional S-Lay techniques.

3 Claims, 3 Drawing Sheets

PIPELINE BRANCH ARRANGEMENT

BACKGROUND OF THE INVENTION

1. Field of the Invention

The invention is generally related to pipeline connections and more particularly to branch pipeline connections that allow a pig to be passed through a pipeline.

2. General Background

For marine pipelines, it is sometimes necessary to move a cleaning or inspection tool commonly known in the industry as a "pig" through the entire length of the pipeline. The need may occur upon completion of the pipeline before it is put into service or after the pipeline has been in service for a period of time.

A marine pipeline system may consist of a number of branch or tributary pipelines feeding product into a common main or trunkline. When it is necessary to pump an intelligent or "smart" pig downstream through a branch line, special considerations in the design of the trunkline-branch connection are necessary. One of the special considerations is inclusion of a "piggable-Y" branch connection in the trunkline to allow the "smart" pig to pass unimpeded from the branch pipeline into the trunkline.

The design arrangement of the piggable-Y in the trunkline will impact the methods of installation of the trunkline portion containing the piggable-Y. The present state-of-the-art technology for design of trunkline piggable-Y connections does not allow for the most direct and low cost installation method; installing the piggable-Y directly in the trunkline during pipe laying of the trunkline.

Particularly for pipe laying operations on the bottom of a body of water, pipeline branch assemblies present a unique set of problems that are interrelated between the insertion and removal of pigs, the pipe laying operation itself, and the installation of the branch connections. These problems involve limitations on the type of pigs that may be used, the limitations and requirements for pipe laying equipment, and the need for the use of divers. These problems will be discussed further in the detailed description with reference to drawings to more clearly illustrate the problems involved.

The present state of the art does not address these problems and leaves a need for pipeline branch connections that are less restrictive on the type of pigs that may be used, the pipe laying operation, and the need for divers.

SUMMARY OF THE INVENTION

The invention addresses the above need. What is provided is a pipeline branch arrangement that forms a piggable-Y at the intersection with the trunkline and is oriented vertically relative to the seabed. The approach piping to all legs of the piggable-Y is configured to incorporate long radii bends; 3D bend radii, or larger as required. This arrangement permits the passage of foam pigs, hard pigs, and smart pigs. Rotation of the piggable-Y to the vertical plane configures all of the branch piping in the vertical plane, which permits the support sled width for pipe laying to be kept to a minimum. The arrangement of the long radii bends fore and aft of the piggable-Y aligns the trunkline pipe ends; i.e., they are co-linear. This permits the configuration to be installed by conventional S-Lay techniques, minimizing special or unique installation procedures. The preferred connection device is a diverless horizontal type collet connector.

BRIEF DESCRIPTION OF THE DRAWINGS

For a further understanding of the nature and objects of the present invention reference should be made to the following description, taken in conjunction with the accompanying drawing in which like parts are given like reference numerals, and wherein:

FIG. 1 is an elevation view of a prior art, typical valve assembly or diver assisted tie-in.

DETAILED DESCRIPTION OF THE PREFERRED EMBODIMENT

Figure 1:
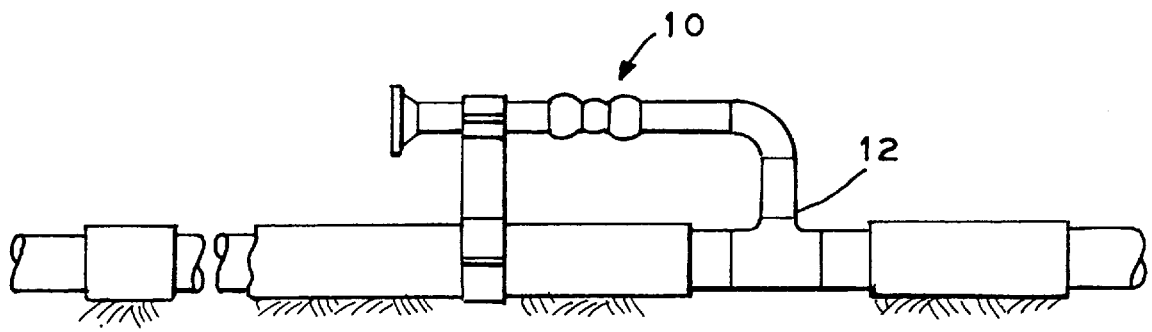

Referring to the drawings, FIG. 1 illustrates a typical branch valve assembly 10 common to pipelay operations in shallow water. This arrangement is directly layable by S-lay methods. It requires diver assistance when making the connection (flanged) but could be converted to diverless operation by replacement of the flange with a diverless connector hub type connection. It employs a standard pipe tee fitting 12, which means that the tributary pipe joins the trunkline pipe at a ninety degree intersection. This type of intersection is limiting to pigging operations. It is piggable only by spherical pigs (typically round liquid-inflated rubber type pigs).

Figure 2:
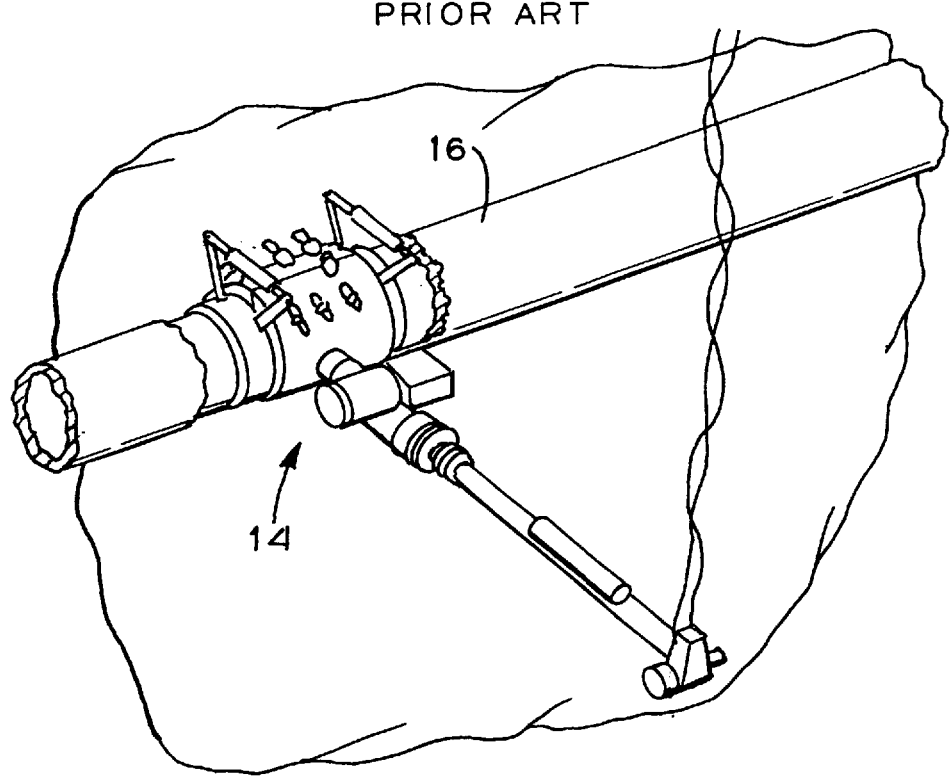
FIG. 2 is an isometric view of a lateral hot tap clamp on a pipeline.

FIG. 2 illustrates a diver-installed hot tap clamp 14. The assembly is fitted and sealed around the pipeline 16 and a penetration is drilled into the pipeline. The ninety degree intersection also limits the types of pigs that may be used, as described above.

Figure 3:
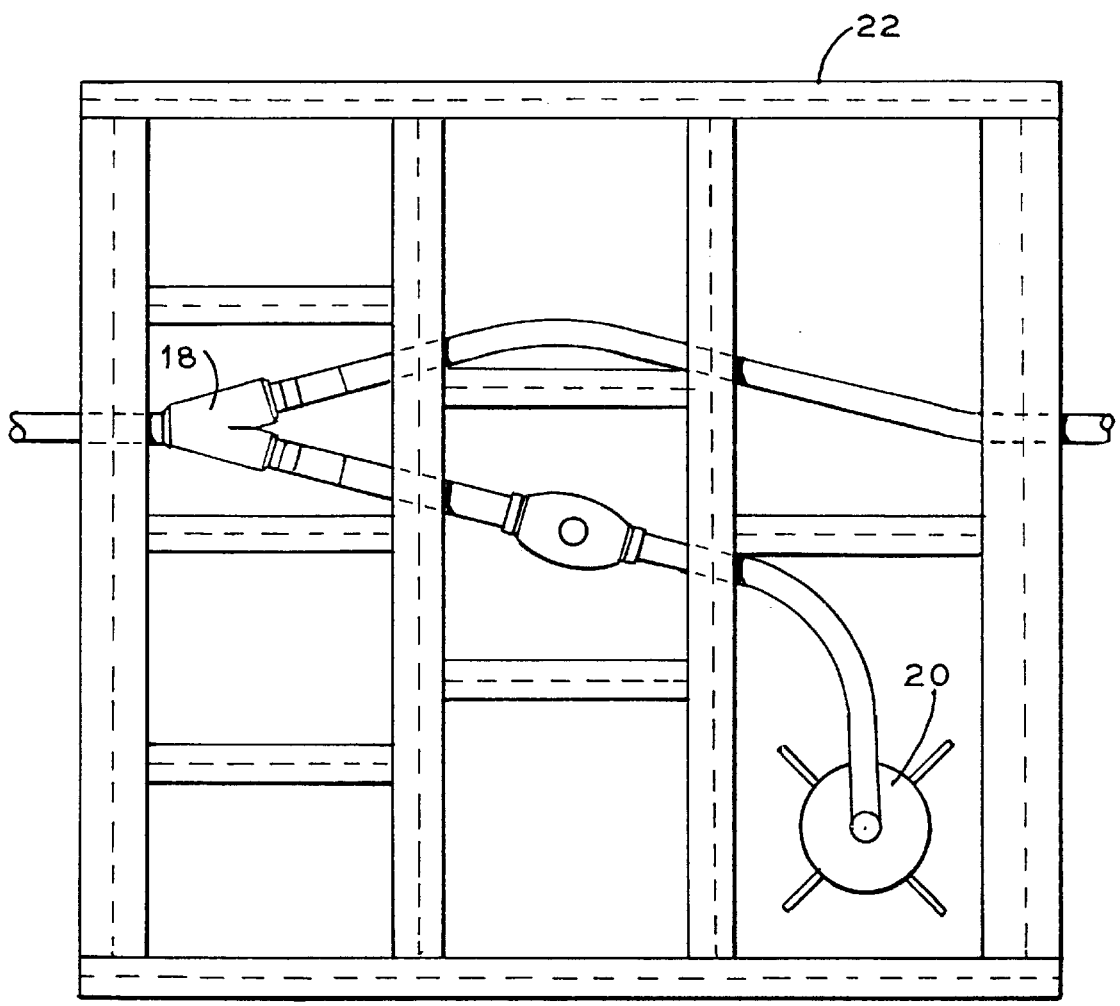
FIG. 3 illustrates a sled with a pre-installed lateral piggable-Y and branch connection.

FIG. 3 illustrates a piggable-Y branch assembly that has been used and the sled required to support the configuration for this arrangement. The piggable-Y has an included angle of thirty degrees. By various industry testing, this arrangement has been determined to be piggable and to be "hard" piggable (includes both cylindrical foam pigs, and pigs with a hard steel structural core member, and semi-rigid plastic cups). It is diverless in that the connection to the tributary line is by a vertically oriented, connector configuration 20 specifically designed for use with a diverless collet connector. This arrangement is limiting in that it requires a large surface area sled 22, typically fifty feet square or larger. Such a sled 22 requires time consuming, special surface handling installation techniques, and is not generally installable by direct pipe laying methods.

Figure 4:
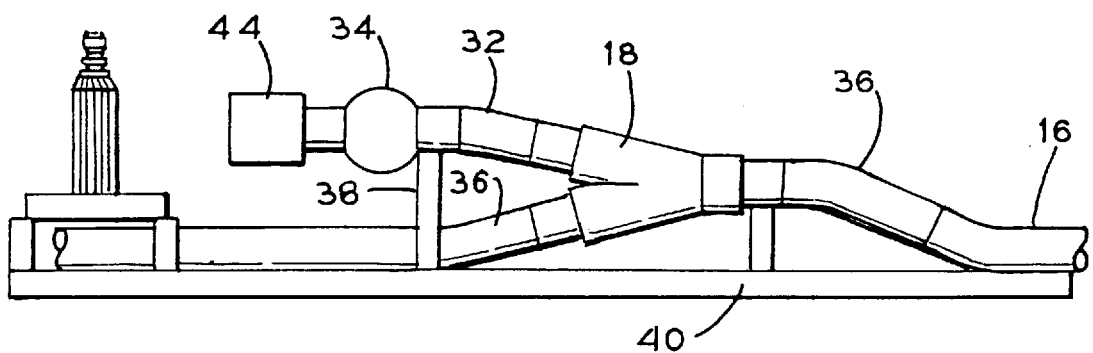
FIG. 4 is an elevation view of the invention.
Figure 5:
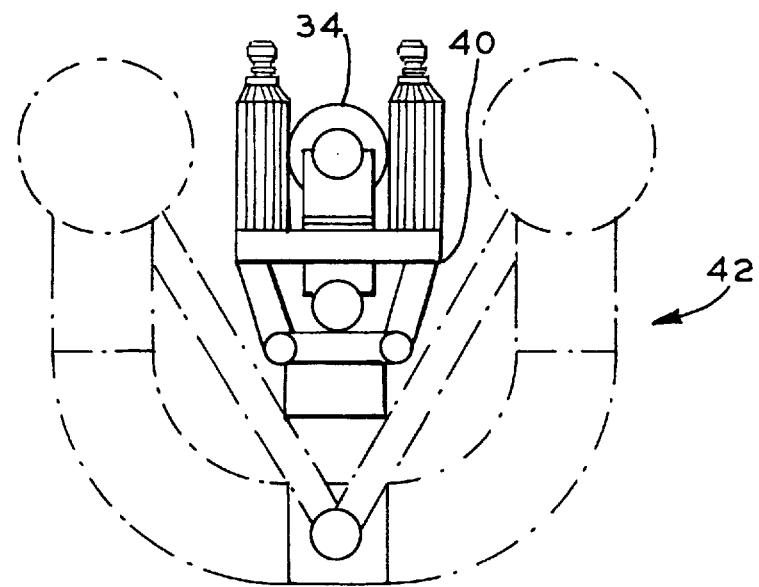
FIG. 5 is an end cross section view of the invention on a pipeline stinger during pipe laying.

The invention is illustrated in FIGS. 4 and 5. The branch arrangement 30 is generally comprised of a piggable-Y intersection 18 placed in the pipeline 16, tributary pipe section 32, isolation ball valve 34, a hub for connection to a horizontal collet connector 44, and vertical bends 36 in the trunkline 16.

The piggable-Y 18 is placed in the pipeline 16 at the desired location with the orientation of the piggable-Y being such that at the open Y end, both legs of the piggable-Y will lie in the same vertical plane. This results in both legs of the piggable-Y being positioned in a common vertical plane with the trunkline 16 during pipe laying operations, and when the trunkline 16 is installed on the sea floor. This is illustrated in FIG. 4. This arrangement contrasts with the prior configuration shown in FIG. 3 where the legs of the piggable-Y are placed in the horizontal plane. In FIG. 3, the trunkline 16 is connected to the downstream stub 24 of the piggable-Y and one upstream leg of the piggable-Y, while the future tributary pipeline 32 will be connected to the upstream stub 26 of the Y. A support 38 may be provided between incoming pipe section 32 and trunkline 16.

Vertical bends 36, bend radii of 3 diameters or larger, are provided in the approach section of the trunkline 16 to both ends of the piggable-Y intersection 18. This bend radius may be increased, as required.

The arrangement of the invention permits the passage of foam pigs, hard pigs, and "smart pigs". Smart pigs are typically inspection-related, and incorporate a linked train of pigs which require larger bend radii to assure passage. Rotation of the piggable-Y intersection 18 to the vertical plane configures all of the branch connection piping in the vertical plane, which permits the support sled 40 to be designed with a much narrower width than the prior art. FIG. 5 illustrates the invention and support sled 40 as they travel through a pipelay stinger 42 during pipe laying. Also, the arrangement of the 3D bends fore and aft of the Y intersection 18 aligns the trunkline 16 ends; i.e., they are collinear. This results in the ability to use conventional direct S-lay techniques, which minimizes special, unique, and more costly installation procedures. The horizontal collet connector 44 may be operated by a remotely operated vehicle (ROV) and does not require the presence of a diver. Eliminating the need for diver interaction with the connector eliminates water depth limitations, other than the ability to support the sled weight during the pipe laying operation.

It should be noted that the invention is not necessarily limited by radius; the radius can be as small as available in the piping. The only limitation presented by a smaller radius bend is the ability to pig the pipe, especially by intelligent pig.

Collet connection 44 is illustrated as being in the horizontal position. If necessary, it may be configured in the vertical position, perpendicular with the trunkline 16 in the installed position. Also, other types of connections may be used to suit the operator.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a pipeline having a trunkline and a branch line, a branch arrangement, comprising:

a. a piggable Y-shaped connector incorporated in the trunkline, said piggable Y-shaped connector positioned such that the two arms of the Y are in the same vertical plane, the tail of the Y being connected to one end of the trunkline and the lower of the two arms of the Y being connected to another end of the trunkline;

b. vertical bend radii of 3 diameters or larger in the trunkline on each side of said piggable Y-shaped connector, such that the trunkline pipe ends connected to the Y-shaped connector are co-linear; and c. the upper arm of the Y-shaped connector adapted to be connected to a branch line.

2. The branch arrangement of claim 1, further comprising an incoming branch line section received in the upper arm of the Y-shaped connector.

3. The branch arrangement of claim 2, further comprising a connector received on the end of said branch line section connected to the Y-shaped connector.

* * * * *